United States Patent [19]  [11]  4,230,433
Jackson  [45]  Oct. 28, 1980

[54] BALE COLLECTOR

[75] Inventor: Michael V. Jackson, Hethersett, England

[73] Assignee: Farmhand (U.K.) Limited, Wymondham, England

[21] Appl. No.: 888,394

[22] Filed: Mar. 20, 1978

Related U.S. Application Data

[63] Continuation of Ser. No. 722,630, Sep. 13, 1976, abandoned.

[30] Foreign Application Priority Data

Sep. 15, 1975 [GB] United Kingdom ............... 37786/75

[51] Int. Cl.² ............................................. A01D 87/12
[52] U.S. Cl. .................................... 414/111; 414/721; 414/723

[58] Field of Search ................... 214/6 B, 144, 145 R, 214/147 R, 350, 352, 353, 620, 621; 56/473.5, 474, 475, 478, 479; 294/87 R; 414/44, 111, 434–437, 607, 608, 721–723, 729, 736, 738

[56] References Cited

U.S. PATENT DOCUMENTS

| 2,734,646 | 2/1956 | Stimpson | 214/147 R |
| 3,112,136 | 11/1963 | Hammond | 214/147 R X |
| 3,155,415 | 11/1964 | Gale | 214/147 R X |
| 3,208,612 | 9/1965 | Blair | 214/144 |
| 3,259,260 | 7/1966 | Blair | 214/147 R |

FOREIGN PATENT DOCUMENTS

| 694152 | 9/1964 | Canada | 294/87 R |
| 1054752 | 1/1967 | United Kingdom | 214/147 R |

Primary Examiner—L. J. Paperner
Attorney, Agent, or Firm—Brisebois & Kruger

[57] ABSTRACT

An attachment is disclosed which is releasably securable to an agricultural bale-loading machine to convert the latter into a combined collector/loader.

1 Claim, 3 Drawing Figures

BALE COLLECTOR

This is a continuation of application Ser. No. 722,630, filed Sept. 13, 1976, now abandoned.

BACKGROUND OF THE INVENTION

It has become common practice in the art of agricultural machinery to provide means for marshalling bales of hay, straw or the like into pre-determined blocks and to provide loaders which are constructed and adapted to handle the blocks so formed as unitary loads. This reduces the cost of handling by largely eliminating manual operatives. It has recently been proposed by Jackson and Avis (U.S. patent application Ser. No. 636,708, now U.S. Pat. No. 4,069,926) and Munson (U.S. patent application Ser. No. 700,580, now abandoned) to use various means to combine the functions of marshalling and loading into a single machine.

SUMMARY OF THE INVENTION

The present invention provides an attachment for converting a bale loader to combined collector/loading mechanism use, said attachment comprising a frame which carries in working configuration a set of bale-marshalling components and which has releasable connection means for connection to said bale loading mechanism. Preferably said base member and said connection means are so constructed as to be operatively aligned with said bale loading mechanism when the latter is lowered onto said attachment from above.

DESCRIPTION OF THE PREFERRED EMBODIMENT

Figure 1:
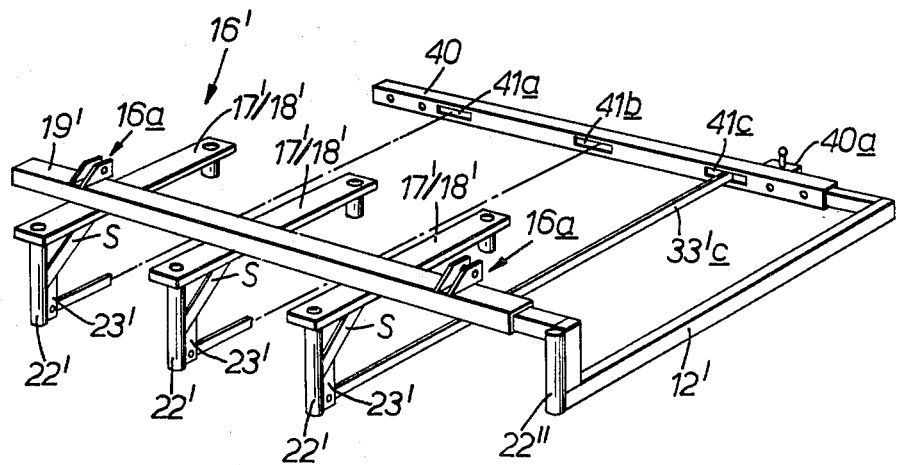
FIG. 1 is a perspective sketch of part of an attachment according to the present invention.

The embodiment illustrated in the drawings is intended for use in a machine analogous to that illustrated in FIGS. 6through 8 of the application of Munson (Ser. No. 700,580) and the accompanying drawings carry numerals corresponding to those in the Munson figures.

The attachment illustrated in FIG. 1 of the accompanying drawings is constructed around a supporting frame generally indicated at 16', comprising a transverse box girder 19' which carries three longitudinally extending, spaced-apart box-section girder members 17'/18'. The forward end of each member 17'/18' is drilled to accommodate a downwardly depending fixed tube 22' in which is journalled a corresponding movable deflector plate (Item 25 in Munson). The rear end of each member 17'/18' is correspondingly drilled to accept the shaft of a sensor member (Item 27 in Munson) linked to the respective movable deflector plate. Each tube 22' carries a rearwardly directed drilled flange 23', and a strut S braces the tube 22' at right angles to the member 17'/18'. Side skirts 12' are adjustably secured between the box girder 19' and a rear transverse box girder 40. For clarity only the left hand side skirt is included in the drawing, but each is a mirror image of the other. The forward end of each side skirt 12' carries a vertically aligned tube 22" to support a side deflector plate (Item 13 in Munson) which may be static or movable. The front face of the rear transverse box girder is slotted at 41a, 41b and 41c to accommodate the rear ends of three inter-row guides 33' of which one, 33'c, is shown, the forward ends of the guides being attached to the corresponding flanges 23'. The slots 41a, b, c allow limited lateral movement of the guides.

Figure 2:
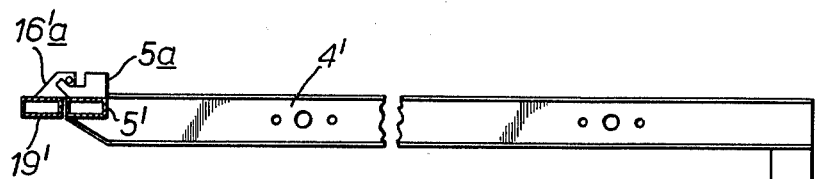
FIG. 2 is a fragmentary side view of a bale fork frame, including an indication of the relative position of the attachment of FIG. 1.
Figure 3:
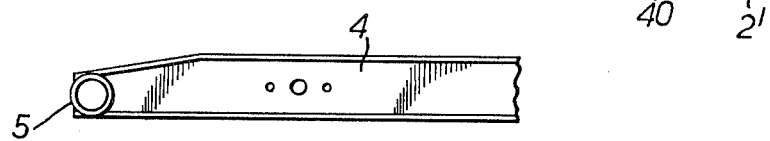
FIG. 3 is a fragmentary side view of a portion of the frame of another bale fork, for purpose of comparison.

It will be appreciated that a bale fork, mounted on the fore-end loader of an agricultural tractor, can be lowered into position over an attachment of the kind illustrated in FIG. 1 without interference with the normal parts of the fork, until the two are in the general relationship indicated in FIG. 2, in which the box girder 19' abuts and may be secured to the front cross tube 5' of the fork frame 1', and the box girder 36 abuts and may be secured to the rear skirt 2' of the fork frame 1'. It will be understood that for the maximum convenience in use the front cross tube 5' of the fork frame in FIG. 2 has been designed as a box-girder section secured between the upper edges of the side members 4' of the fork. The transverse member 5' carries a pair of upstanding lugs 5a which serve to engage corresponding sockets 16a on the attachment. Each socket is formed by a pair of brackets supporting a transverse rod. The fork, carried on a tractor fore-end loader, can then be manoeuvred into position above the attachment, and the lugs 5a nosed into the sockets 16a. Then, with the rear 2' of the fork frame lowered to the ground, the attachment may be fully secured to the fork by means of a bolt mechanism 40a which engages in a stirrup (not shown) on the member 2'. In contrast to this arrangement, the design of the fork illustrated in Munson's application, as illustrated in FIG. 3, provides a cross-tube 5 which is of circular section and is secured between the lower edges of the side members 4. It would, however, be possible, at some cost in terms of simplicity of design and ease of handling, to modify the illustrated attachment for use with existing forks of the pattern indicated in FIG. 3. We recommend, however, that in so far as is possible, all the extra components required to convert a bale fork to combined collector/loader use should be carried on the attachment in such a way that it forms a single unit.

I claim:

1. A releasable attachment for the conversion into a combined collector/loader of a bale loading mechanism having a main frame which supports bale-gripping means and is adapted to be mounted on an agricultural tractor for transport of bales gripped by the bale-gripping means, wherein said attachment comprises a sub-frame which carries a set of bale-guiding components constructed and adapted to cause bales to be guided into their respective relative positions in an array which can be gripped in its entirety by said gripping means, and further comprises connecting means releasably engagable with cooperating means on said main frame for securing said sub-frame in correct working relation to said main frame and securing means for releasably securing said sub-frame to said main frame in said correct working relation, and wherein said connecting means on said sub-frame are spaced apart on a front member thereof for engagement with correspondingly spaced cooperating means on a front member of said main frame in such manner that when engaged, rearward and vertical movement of said sub-frame relative to said main frame are precluded, and wherein said securing means are located on a rear member of said sub-frame, said arrangement permitting connection of said bale loading mechanism to said attachment by lowering the mechanism onto the attachment, engaging said connecting means with said cooperating means by forward movement of said bale-loading mechanism relative to the attachment, and securing said sub-frame to said main frame by said securing means.

* * * * *